(12) United States Patent
Sawada (10) Patent No.: US 9,039,075 B2
(45) Date of Patent: May 26, 2015

(54) ROOF APPARATUS

(71) Applicant: AISIN SEIKI KABUSHIKI KAISHA, Kariya-shi, Aichi-ken (JP)

(72) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/256,100

(22) Filed: Apr. 18, 2014

(65) Prior Publication Data

US 2014/0312658 A1 Oct. 23, 2014

(30) Foreign Application Priority Data

Apr. 19, 2013 (JP) ................................. 2013-088394

(51) Int. Cl.
*B60J 10/00* (2006.01)
*B60J 10/12* (2006.01)
*B60J 7/043* (2006.01)

(52) U.S. Cl.
CPC .............. *B60J 10/0054* (2013.01); *B60J 10/12* (2013.01); *B60J 7/043* (2013.01)

(58) Field of Classification Search
CPC ......... B60J 10/0054; B60J 10/12; B60J 7/043
USPC ....................... 296/216.06–216.09
See application file for complete search history.

(56) References Cited

U.S. PATENT DOCUMENTS

| 5,727,839 | A | * | 3/1998 | Ruhringer et al. ............. 296/213 |
| 6,685,263 | B2 | | 2/2004 | Sawada et al. |
| 8,807,641 | B2 | * | 8/2014 | Kikuchi et al. ........... 296/216.09 |
| 2003/0127884 | A1 | * | 7/2003 | Sawada et al. ........... 296/216.09 |
| 2003/0155794 | A1 | * | 8/2003 | Itoh et al. ................. 296/216.09 |
| 2007/0069553 | A1 | * | 3/2007 | Yamada et al. ........... 296/216.07 |
| 2010/0308626 | A1 | * | 12/2010 | Grummett et al. ......... 296/216.09 |

FOREIGN PATENT DOCUMENTS

DE 3100757 * 12/1981
JP 2003-165343 6/2003

* cited by examiner

*Primary Examiner* — Dennis H Pedder
(74) *Attorney, Agent, or Firm* — Finnegan, Henderson, Farabow, Garrett & Dunner, LLP (57) ABSTRACT

A roof apparatus includes: panels juxtaposed in a longitudinal direction and configured to cover an opening formed in a roof of a vehicle, a first panel serving as one of the panels; downward-erected walls extending to both edge portions in a width direction of the first panel along the longitudinal direction, and extending downward; a sealing member extending along the width direction on an edge portion of a second panel facing the first panel in the longitudinal direction, the second panel serving as one of the panels, and being arranged in front of or behind the first panel, the sealing member having a sealing portion which can be in liquid-tight contact with an edge end and a lower surface of the edge portion the first panel, and a tip portion of the sealing member having notches; and panel side protruding portions disposed to protrude in the width direction where the panel side protruding portions face both of the downward-erected walls.

8 Claims, 8 Drawing Sheets

FORWARD REARWARD

ROOF APPARATUS

CROSS REFERENCE TO RELATED APPLICATIONS

This application is based on and claims priority under 35 U.S.C. §119 to Japanese Patent Application 2013-088394, filed on Apr. 19, 2013, the entire contents of which are incorporated herein by reference.

TECHNICAL FIELD

This disclosure relates to a roof apparatus configured to cover an opening formed in a roof of a vehicle with a plurality of panels juxtaposed in a vehicle longitudinal direction.

BACKGROUND DISCUSSION

Figure 11:
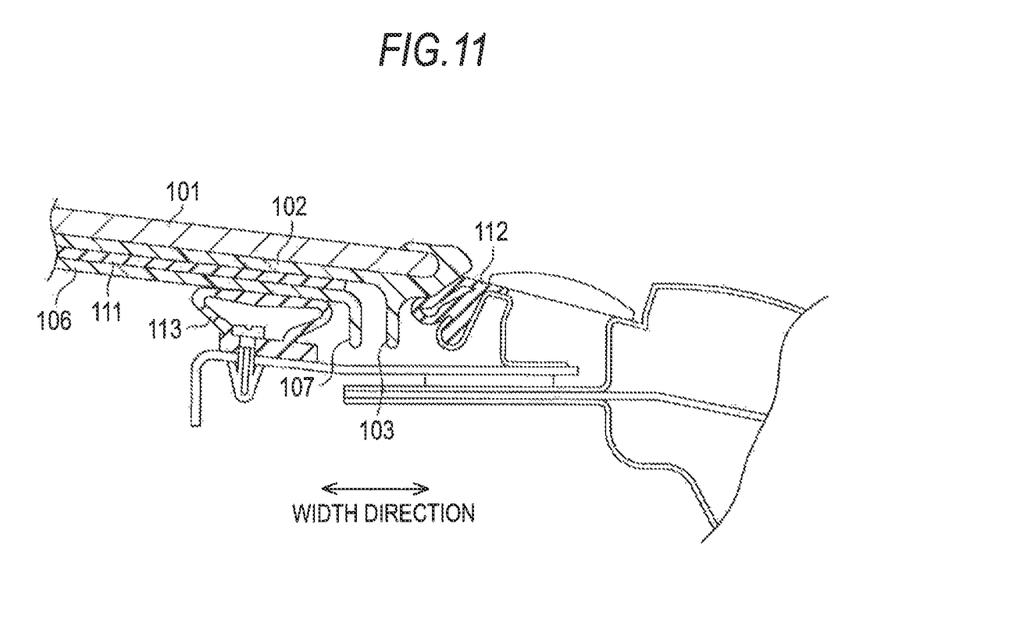
FIG. 11 is a horizontal cross-sectional view illustrating the related art.

In the related art, a roof apparatus disclosed in JP 2003-165343A (Reference 1) has been known. As illustrated in FIG. 11, out of a plurality of panels covering an opening formed in a roof of a vehicle, a first panel 101 arranged in a vehicle front part is joined to a liner 102 made of a resin material, which extends along a rear edge thereof in a vehicle width direction. In contrast, a retainer 106 made of the resin material, which extends along a front edge thereof in the vehicle width direction, is disposed in a second panel (not illustrated) which is adjacent to the first panel 101 and arranged in a rear part of the vehicle. The retainer 106 extends forward with respect to the vehicle and downward in a vehicle height direction further than the second panel.

An upper portion of the retainer 106 is joined to a first weather strip 111 which extends along a longitudinal direction thereof in the vehicle width direction. The first weather strip 111 is in liquid-tight contact with the liner 102 of the first panel 101 overlapped in the vehicle height direction, and seals a clearance (boundary portion) between the first panel 101 and the second panel.

In addition, the roof has a second weather strip 112 which seals a clearance between an edge end of the first panel 101 and the second panel in the vehicle width direction (edge end of a resin portion where the liner 102 and the retainer 106 are integrated with each other) and the opening. Furthermore, the roof has a third weather strip 113 which seals a clearance between a lower surface of an edge portion of the first panel 101 and the second panel in the vehicle width direction (resin portion where the liner 102 and the retainer 106 are integrated with each other) and the opening.

Then, a first protection wall 103 covering, integrally with the liner 102, a tip portion in the vehicle width direction of the first weather strip 111 is erected in a tip portion in the vehicle width direction of a rear end of the first panel 101. In addition, a second protection wall 107 which is integrated with the retainer 106 and positioned below, in the vehicle height direction, the tip portion in the vehicle width direction of the first weather strip 111 and positioned further inside in the vehicle width direction than the first protection wall 103 is erected in a tip portion in the vehicle width direction of a front end of the second panel.

Accordingly, for example, when a high pressure cleaning solution is injected to clean the vehicle, even if the high pressure cleaning solution permeates a clearance with the second weather strip 112, the first and second protection walls 103 and 107 prevent the high pressure cleaning solution from being directly sprayed on the tip portion in the vehicle width direction of the first weather strip 111 or the third weather strip 113 (sealing surface). Therefore, it is possible to improve a sealing performance of the tip portion in the vehicle width direction in the clearance (boundary portion) between the first panel 101 and the second panel.

Incidentally, in Reference 1, the second protection wall 107 extends across a clearance between the first panel 101 and the second panel in a range in a vehicle longitudinal direction. Consequently, it is necessary to increase an arrangement space in the vehicle width direction in the range of a roof apparatus.

SUMMARY

Thus, a need exists for a roof apparatus which is not suspectable to the drawback mentioned above.

An aspect of this disclosure is directed to a roof apparatus including: a plurality of panels that are juxtaposed in a vehicle longitudinal direction and configured to cover an opening formed in a roof of a vehicle and to adapt to the roof, a first panel serving as one of the plurality of panels being configured to be capable of opening and closing the opening in response to an ascending and descending operation: a pair of downward-erected walls that extend to both edge portions in a vehicle width direction of the first panel along the vehicle longitudinal direction, and that extend downward in a vehicle height direction; a sealing member that extends along the vehicle width direction on an edge portion of a second panel facing the first panel in the vehicle longitudinal direction, the second panel serving as one of the plurality of panels, and being adjacent to the first panel and arranged in front of or behind the first panel in the vehicle longitudinal direction, the sealing member having a sealing portion which can be in liquid-tight contact with an edge end in the vehicle longitudinal direction of the first panel and a lower surface of the edge portion in the vehicle longitudinal direction of the first panel, and a tip portion in the vehicle longitudinal direction of the sealing member having a pair of notches which are recessed in a mode of approaching each other from both sides facing each other in the vehicle width direction so that both of the downward-erected walls can enter further downward in the vehicle height direction than a sealing surface of the sealing portion when the first panel is in a descended state; and a pair of panel side protruding portions that are respectively disposed to protrude in the vehicle width direction where the pair of panel side protruding portions respectively face both of the downward-erected walls, and that are arranged at predetermined positions within a range in the vehicle longitudinal direction of both of the notches, when the first panel is in the descended state.

According to this configuration, the tip portion in the vehicle longitudinal direction of the sealing member has the pair of notches so that both of the downward-erected walls can enter further downward in the vehicle height direction than the sealing portion when the first panel is in the descended state, that is, in an entirely closed state. For this reason, for example, a clearance is formed in the vehicle width direction between the respective downward-erected walls and the respective notches, thereby forming a permeating path for water in the vehicle longitudinal direction. However, the panel side protruding portions disposed to protrude to the respective downward-erected walls are arranged at the predetermined positions within the range in the vehicle longitudinal direction of the respective notches, when the first panel is in the descended state. In this manner, in the panel side protruding portions, it is possible to decrease an opening width of the permeating path in the vehicle width direction. Accordingly, for example, when a high pressure cleaning solution is injected to clean a vehicle, even if the high pressure cleaning solution permeates the clearance with the sealing portion, it is possible to reduce a possibility that the high pressure cleaning solution may permeate the permeating path. Therefore, it is possible to improve a sealing performance of the tip portion in the vehicle width direction in the clearance (boundary portion) between the first panel and the second panel. In particular, the panel side protruding portions are disposed to protrude so as to align with the predetermined positions within the range in the vehicle longitudinal direction of the notches formed in the sealing member. In this manner, it is possible to avoid an increase in an arrangement space in the vehicle width direction, over the entire range in the vehicle longitudinal direction across the clearance between the first panel and the second panel.

According to the aspect of this disclosure, there is an advantageous effect that can suppress the increase in the arrangement space in the vehicle width direction and can improve the sealing performance in the tip portion in the vehicle width direction in the clearance between two panels which are adjacent to each other in the vehicle longitudinal direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a roof apparatus will be described. In the following description, a vehicle longitudinal direction is referred to as a "longitudinal direction", and upward and downward in a vehicle height direction are respectively referred to as "upward" and "downward". In addition, a vehicle width direction is referred to as a "width direction". An inner side in the vehicle width direction toward a vehicle interior and an outer side in the vehicle width direction toward a vehicle exterior are respectively referred to as a "vehicle interior side" and a "vehicle exterior side".

Figure 1:
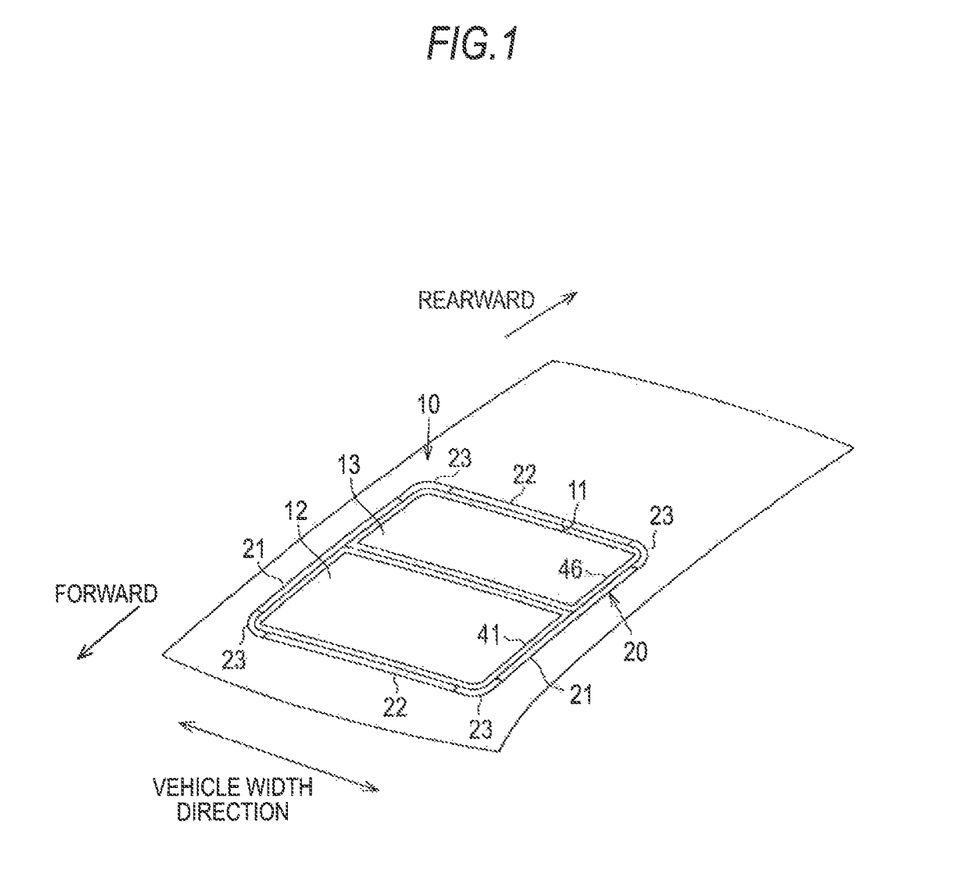
FIG. 1 is a perspective view illustrating an entirely closed state of an embodiment disclosed here.
Figure 2:
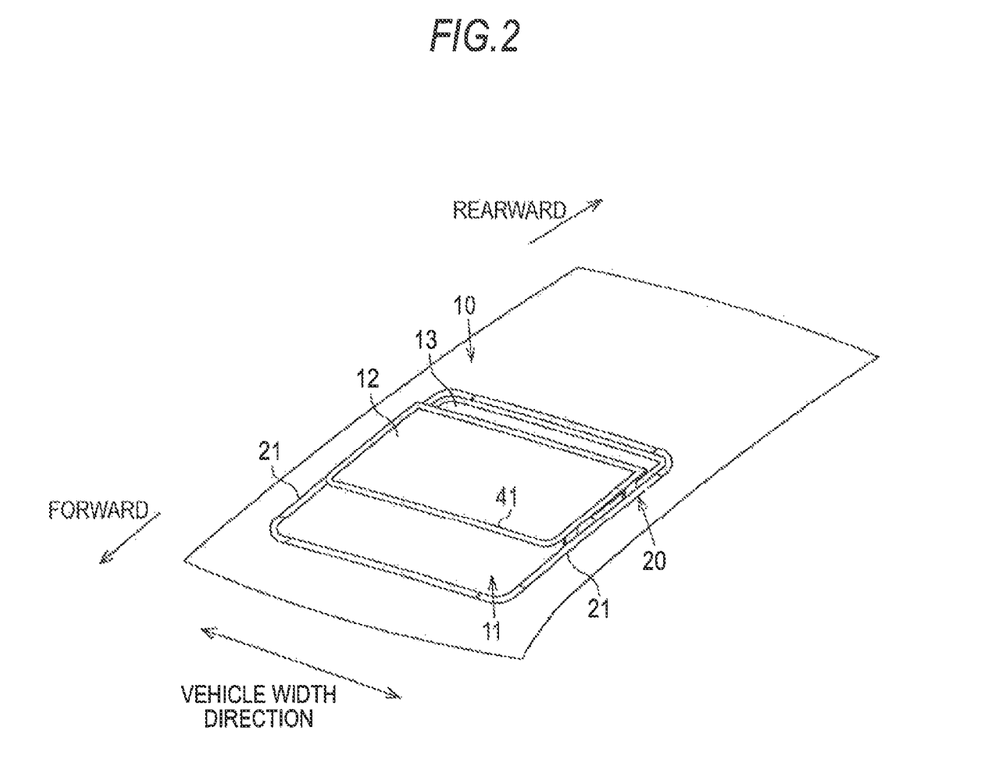
FIG. 2 is a perspective view illustrating an opened state of the embodiment.

As illustrated in FIGS. 1 and 2, a substantially rectangular opening 11 is formed, and a substantially rectangular movable panel 12 and a fixed panel 13 which are formed to have a glass plate, for example, are installed on a roof 10 of a vehicle such as an automobile. The movable panel 12 serving as a first panel is attached so as to be capable of opening and closing a front section of the opening 11. That is, the movable panel 12 is attached so as to enable a tilt-up operation where a rear side section ascends about a fulcrum of a front side section thereof, a pop-up operation where both of the front side section and the rear side section ascend, and a sliding operation in the longitudinal direction. In an opening and closing operation for a front section of the opening 11 which is performed by the movable panel 12, a so-called outer sliding type is employed in which the sliding operation is performed while a pop-up state is maintained. On the other hand, the fixed panel 13 serving as a second panel is attached so as to always close a rear section of the opening 11.

Figure 3A:
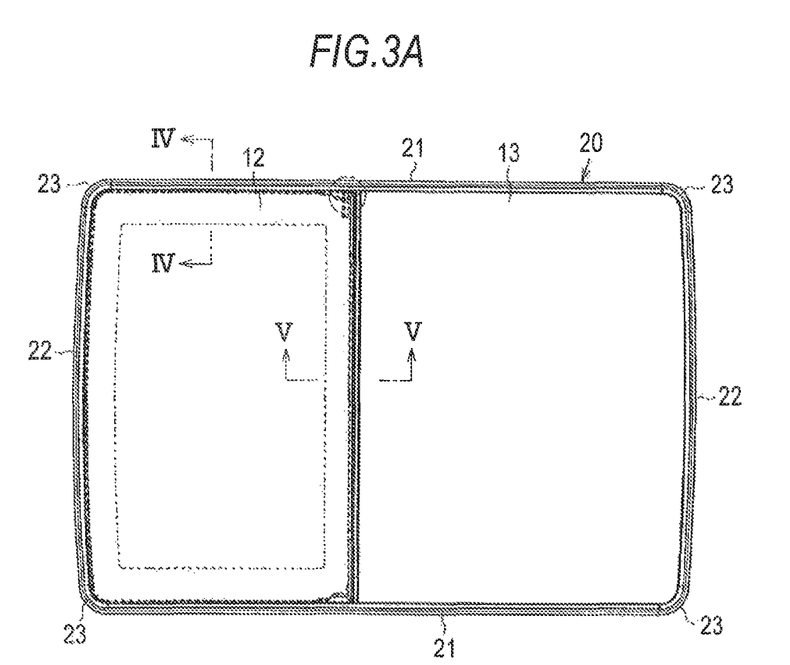
FIG. 3A is a plan view illustrating the entirely closed state of the embodiment.
Figure 3B:
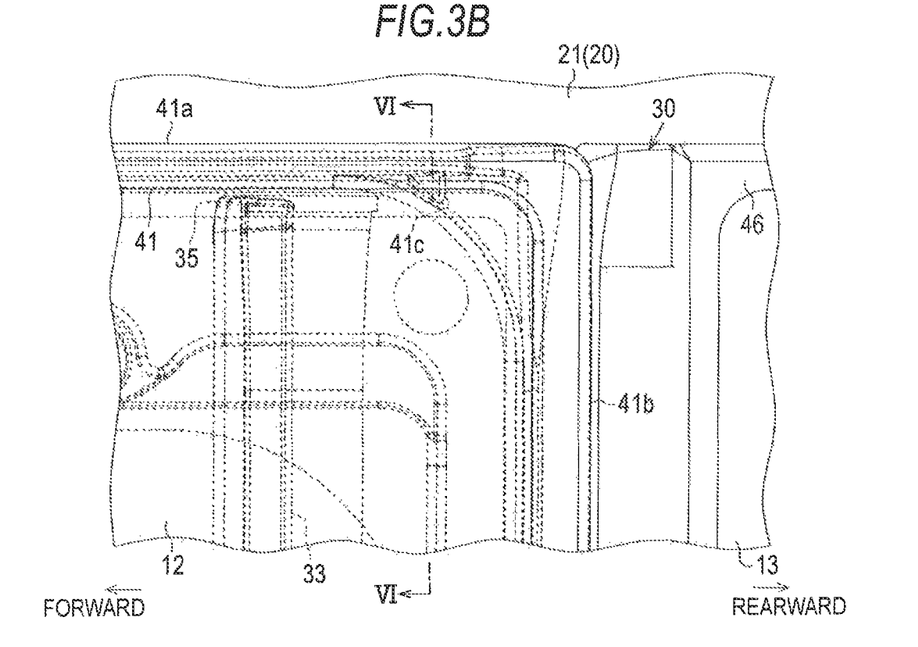
FIG. 3B is an enlarged view of FIG. 3A.

In addition, as collectively illustrated in FIGS. 3A and 3B, a body sealing member 20 having a substantially rectangular ring shape is installed along a peripheral edge of the opening 11 in the roof 10. The body sealing member 20 includes a pair of side weather strips 21 serving as body weather strips which are arranged in both sides in the width direction and extend in the longitudinal direction, and a pair of front and rear weather strips 22 which extend in the width direction and respectively connect front ends and rear ends of the pair of side weather strips 21 via molded corners 23. The side weather strips 21 have a constant cross section in the longitudinal direction, and the front and rear weather strips 22 have a constant cross section in the width direction. These side weather strips 21 and front and rear weather strips 22 are in liquid-tight contact with an opening edge end of the opening 11.

On the other hand, the movable panel 12 has an edge portion 41 having a substantially rectangular ring shape and formed of, for example, a resin material, along a peripheral edge portion thereof. The fixed panel 13 has an edge portion 46 having a substantially rectangular ring shape and formed of, for example, a resin material, along a peripheral edge portion thereof. The edge portion 41 is in liquid-tight contact with a front portion of both side weather strips 21 and a front side of the front and rear weather strips 22. The edge portion 46 is in liquid-tight contact with a rear portion of both side weather strips 21 and a rear side of the front and rear weather strips 22. In this manner, the opening 11 is sealed over an entire periphery in an entirely closed state of the movable panel 12.

When viewed from above (that is, from a designed surface side), the body sealing member 20 extends in a substantially linear shape over a substantially entire length in the longitudinal direction of the opening 11, including a boundary portion between the movable panel 12 and the fixed panel 13 in the respective side weather strips 21. In addition, when viewed from above, the edge portion 41 of the movable panel 12 which comes into contact with the respective side weather strips 21 in the entirely closed state is juxtaposed in a substantially linear shape with respect to the edge portion 46 of the fixed panel 13 which similarly comes into contact with the respective side weather strips 21. That is, the edge portion 41 of the movable panel 12 and the edge portion 46 of the fixed panel 13 are arranged at positions equal to each other in the width direction.

Figure 4:
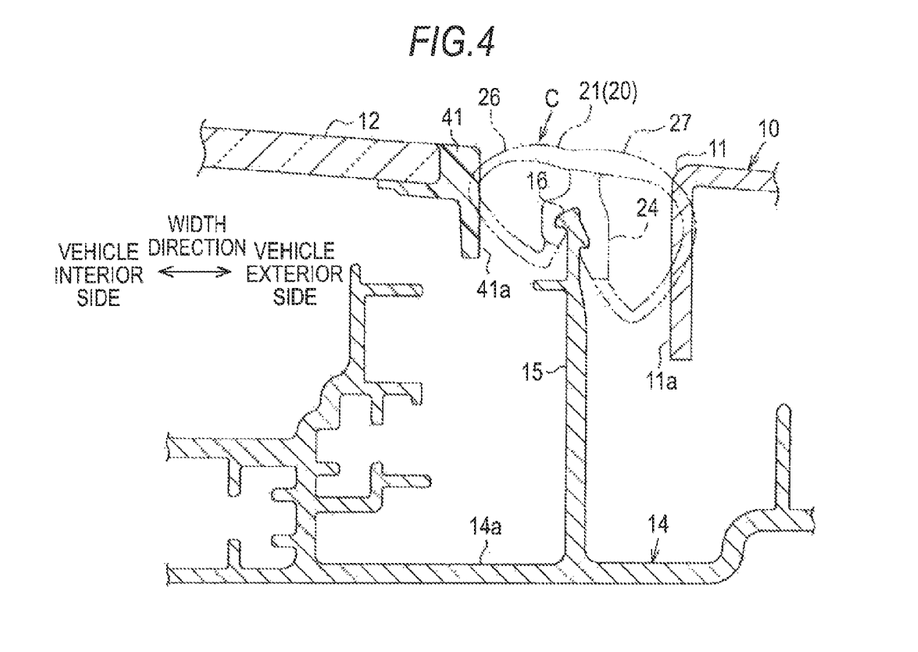
FIG. 4 is a cross-sectional view along line IV-IV in FIG. 3A.

As illustrated in FIG. 4, a panel side flange 41a extending downward is formed in an edge end in the width direction of the edge portion 41 of the movable panel 12. In addition, a similar panel side flange (not illustrated) is also formed in an edge end in the width direction of the edge portion 46 of the fixed panel 13. On the other hand, a guide rail 14 made of aluminum alloy extruded material, for example, extends in the longitudinal direction (direction orthogonal to a paper surface in FIG. 4), below the opening 11 in the respective edge portions in the width direction of the roof 10. This guide rail 14 has a substantially long bottom wall 14a extending in the longitudinal direction, and has a vertical wall portion 15 erected upward from the bottom wall 14a.

The vertical wall portion 15 is arranged inside a clearance C formed between a body side flange 11a extending downward from the opening edge end of the opening 11 and the panel side flange 41a of the movable panel 12 (and the panel side flange of the fixed panel 13) in the entirely closed state. Then, a substantially triangular locking portion 16 which is sharpened upward in a cross-sectional view is formed in an upper end portion of the vertical wall portion 15.

The side weather strip 21 is fixed to the upper end portion of the vertical wall portion 15. The side weather strip 21 is formed to have an extruded material of synthetic rubber such as EPDM or thermoplastic elastomer, for example. Then, the side weather strip 21 has a holding object portion 24 formed of a solid material of which lower part is opened downward in the width direction, and a first side sealing portion 26 and a second side sealing portion 27 made of a sponge material which are connected to an upper end of the holding object portion 24. The side weather strip 21 is fitted and attached to the locking portion 16 in the holding object portion 24 so as not to slip out therefrom.

The first side sealing portion 26 is bent in a substantially arc shape in a cross-sectional view so as to protrude to the vehicle interior side (flange 41a side of the movable panel 12). Then, the first side sealing portion 26 is connected to a lower end of the holding object portion 24, and forms a hollow portion in the vehicle interior side of the vertical wall portion 15 in cooperation with the holding object portion 24. The first side sealing portion 26 is elastically deformed no as to be partially overlapped with the panel side flange 41a of the movable panel 12 in the vehicle height direction in the entirely closed state, thereby coming into liquid-tight contact therewith. Alternatively, in the similar manner, the first side sealing portion 26 is elastically deformed so as to be partially overlapped with the panel side flange of the fixed panel 13 in the vehicle height direction, thereby coming into liquid-tight contact therewith.

The second side sealing portion 27 is bent in a substantially arc shape in a cross-sectional view so as to protrude to the vehicle exterior side (flange 11a side of the body side). Then, the second side sealing portion 27 is connected to the lower end of the holding object portion 24, and forms a hollow portion in the vehicle exterior side of the vertical wall portion 15 in cooperation with the holding object portion 24. The second side sealing portion 27 is elastically deformed so as to be partially overlapped with the body side flange 11a of the opening 11 in the vehicle height direction, thereby coming into liquid-tight contact therewith.

Figure 5:
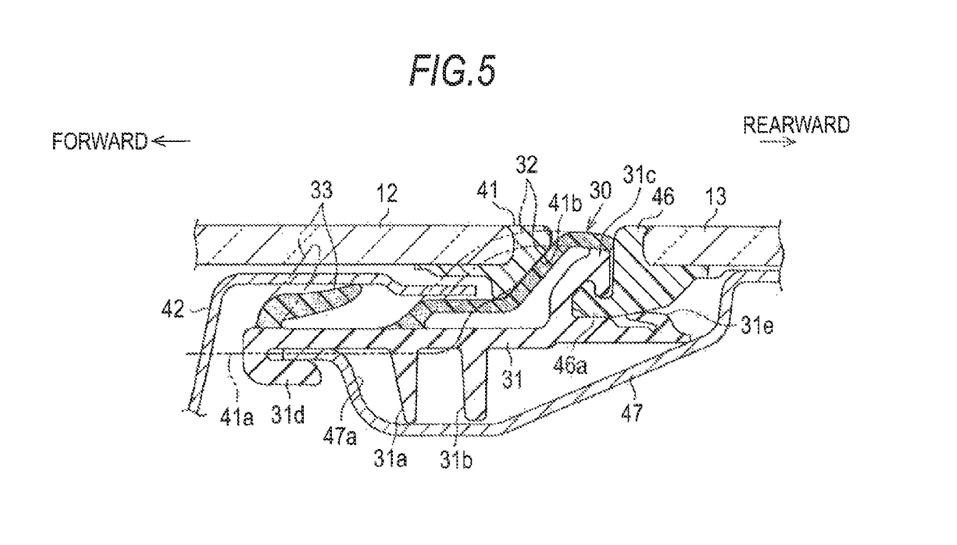
FIG. 5 is a cross-sectional view along line V-V in FIG. 3A.

As illustrated in FIG. 5, a tilting surface 41b which tilts forward as it goes from an upper end to below is formed in a rear edge end of the edge portion 41 of the movable panel 12. Then, as collectively illustrated in FIG. 8A, a rear end of the respective panel side flanges 41a tilts substantially forward to follow the tilting surface 41b as it goes from the upper end to below. In FIG. 5, for the sake of convenience, an outline of the panel side flange 41a is repeatedly illustrated by a two-dot chain line.

Here, a periphery of the movable panel 12 is held by a base panel 42 which is formed to have a metal plate and is joined to a lower surface of the movable panel 12, and is operated integrally with the base panel 42. In contrast, the fixed panel 13 is configured so that a lower surface thereof is fixed to and held by a base panel 47 formed to have a metal plate, for example, so as to close a rear portion of the opening 11. The base panel 47 extends along a front edge portion of the fixed panel 13 in the width direction over the entire length in the width direction, and extends downward from the rear edge portion of the movable panel 12 in the entirely closed state including the front edge portion of the fixed panel 13 in the longitudinal direction. The base panel 47 is curved downward and forms an accommodation recess 47a. In a front edge end of the edge portion 46 of the fixed panel 13, a panel side engagement projection 46a having a substantially hook shape in a cross-sectional view is disposed to project forward from a lower side portion.

A panel weather strip 30 as a sealing member which extends in the width direction over the substantially entire length in the width direction is installed in the base panel 47. That is, the panel weather strip 30 is arranged below the movable panel 12 and the fixed panel 13 to align with a boundary portion therebetween. The panel weather strip 30 is formed to have an extruded material of synthetic rubber such as EPDM or thermoplastic elastomer, for example, and has a substantially constant cross section in the longitudinal direction (width direction).

The panel weather strip 30 integrally includes an attachment base 31, a first sealing portion 32 and a second sealing portion 33.

The attachment base 31 is molded in a substantially plate shape by using a solid material, and has a front and rear pair of first leg portion 31a and second leg portion 31b which extend downward and are brought into contact with or are caused to approach the accommodation recess 47a. In addition, the rear edge portion of the attachment base 31 has a sealing side engagement projection 31c having a substantially hook shape in cross section which projects upward so as to engage with the panel side engagement projection 46a of the fixed panel 13 in an alternate manners. Furthermore, a clamping portion 31d which is folded back so as to pinch the front edge end of the base panel 47 with the front edge end thereof is disposed to extend in the attachment base 31. That is, the attachment base 31 (panel weather strip 30) is configured so that the panel side engagement projection 46a and the sealing side engagement projection 31c engage with each other in the alternate manners, and is fixed to the fixed panel 13 and the like by causing the clamping portion 31d to pinch the front edge end of the base panel 47.

A base end portion of the attachment base 31 comes into liquid-tight contact with the respective side weather strips 21 (first sealing portion 26) and seals a portion between the side weather strips 21 and the base end portion. A lip portion 31e extending obliquely forward and upward is disposed to project in the rear edge end of the attachment base 31. The lip portion 31e elastically comes into contact with the lower surface of the edge portion 46 behind the panel side engagement projection 46a, and seals a portion between the attachment base 31 (panel weather strip 30) and the fixed panel 13 (edge portion 46).

The first sealing portion 32 is molded using a sponge material and is bent in a substantially arc shape in a cross-sectional view so as to convex obliquely forward and upward in a free state. Then, the first sealing portion 32 is configured so that one end is connected to an upper surface of the attachment base 31 behind the second sealing portion 33 and below the rear edge portion of the base panel 42 when the movable panel 12 is in the entirely closed state, and the other end is connected to an upper surface of the sealing side engagement projection 31c, thereby forming a hollow portion on the edge portion 41 side of the movable panel 12 in cooperation with the attachment base 31. The first sealing portion 32 is elastically deformed so as to be vertically overlapped with the substantially entire tilting surface 41b of the movable panel 12 in the entirely closed state, thereby coming into liquid-tight contact therewith.

In addition, the first sealing portion 32 comes into liquid-tight contact with the front edge end of the fixed panel 13 (edge portion 46) in the rear edge end thereof. That is, the first sealing portion 32 is in liquid-tight contact with both of the rear edge end (tilting surface 41b) of the movable panel 12 in the entirely closed state and the front edge end of the fixed panel 13.

The second sealing portion 33 is molded using a sponge material, and one end thereof is connected to the upper surface of the front edge end of the attachment base 31. The second sealing portion 33 is molded in a substantially lip shape which extends obliquely rearward and upward from the attachment base 31. The second sealing portion 33 is elastically deformed so as to be vertically overlapped with the movable panel 12 in the entirely closed state or the lower surface of the base panel 42 in front of the first sealing portion 32, thereby coming into liquid-tight contact therewith.

As described above, the panel weather strip 30 seals the boundary portion (clearance) between the movable panel 12 in the entirely closed state and the fixed panel 13 over the substantially entire length in the width direction in cooperation with the first sealing portion 32 and the second sealing portion 33 (doubly). The first sealing portion 32 comes into contact with the rear edge end (tilting surface 41b) of the movable panel 12 in the entirely closed state in a wide area which is curved due to elastic deformation. Therefore, a more reliable sealing performance is ensured even if there are variations in a position of the movable panel 12 relative to the fixed panel 13, that is, in the clearance between the movable panel 12 and the fixed panel 13.

As described above, the panel weather strip 30 fixed to the base panel 47 is brought into contact with or is caused to approach the accommodation recess 47a in the first leg portion 31a and the second leg portion 31b of the attachment base 31, and forms a vertical space in a portion formed with the accommodation recess 47a. In this manner, when the movable panel 12 is in pressurizing contact with the first sealing portion 32 in response to a closing operation (descending operation) of the movable panel 12, downward deflection of the attachment base 31 is allowed. This is because variations in attaching the movable panel 12 in the entirely closed state to the fixed panel 13 are absorbed, and the first sealing portion 32 and the second sealing portion 33 are more reliably brought into contact with the panels, thereby preferably ensuring the sealing performance.

In particular, the first leg portion 31a and the second leg portion 31b of the attachment base 31 are brought into contact with or are caused to approach the accommodation recess 47a. In this manner, even if the movable panel 12 is brought into pressurizing contact with the first sealing portion 32 and the like in response to the closing operation (descending operation) of the movable panel 12, the first leg portion 31a and the second leg portion 31b are deflected to suppress excessive downward deformation of the attachment base 31.

The panel weather strip 30 is held by the fixed panel 13 and the like in the sealing side engagement projection 31c and the clamping portion 31d of the attachment base 31, even without performing bonding by using a double-sided tape for example. In this manner, even if the movable panel 12 comes into contact with the first sealing portion 32 and the second sealing portion 33, a positional deviation in the longitudinal direction with respect to the fixed panel 13 is suppressed.

Incidentally, as described above, when the movable panel 12 is in the entirely closed state (the descended state), the rear end portion of the panel side flange 41a tilts substantially forward as it goes from the upper end to below to follow the tilting surface 41b. Then, the panel side flange 41a (excluding the rear end portion) extends further downward from the attachment base 31 of the panel weather strip 30 (excluding the first and second leg portions 31a and 31b). That is, the panel side flange 41a and the panel weather strip 30 are configured so that vertical positions are overlapped with each other particularly in the front end portion of the panel weather strip 30.

Figure 8A:
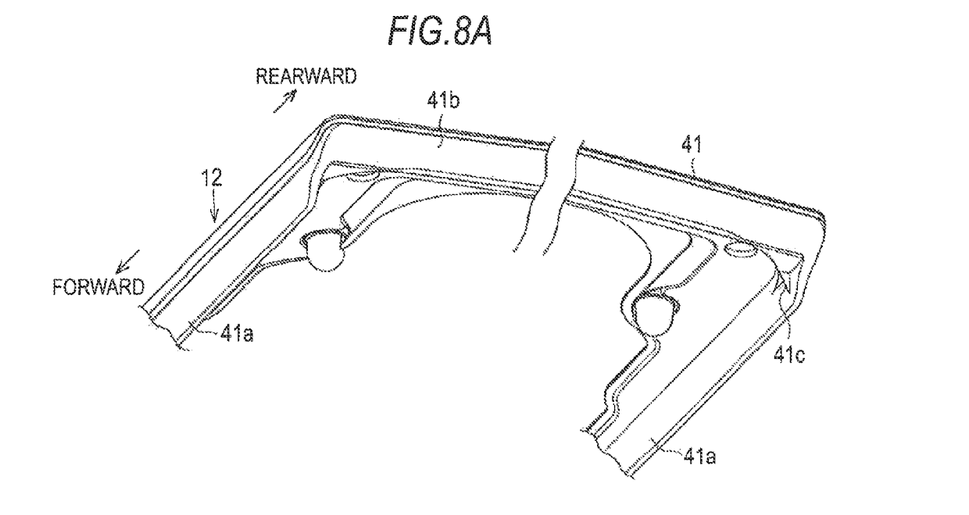
FIG. 8A is a perspective view when a rear end portion of a movable panel is viewed from below.
Figure 8B:
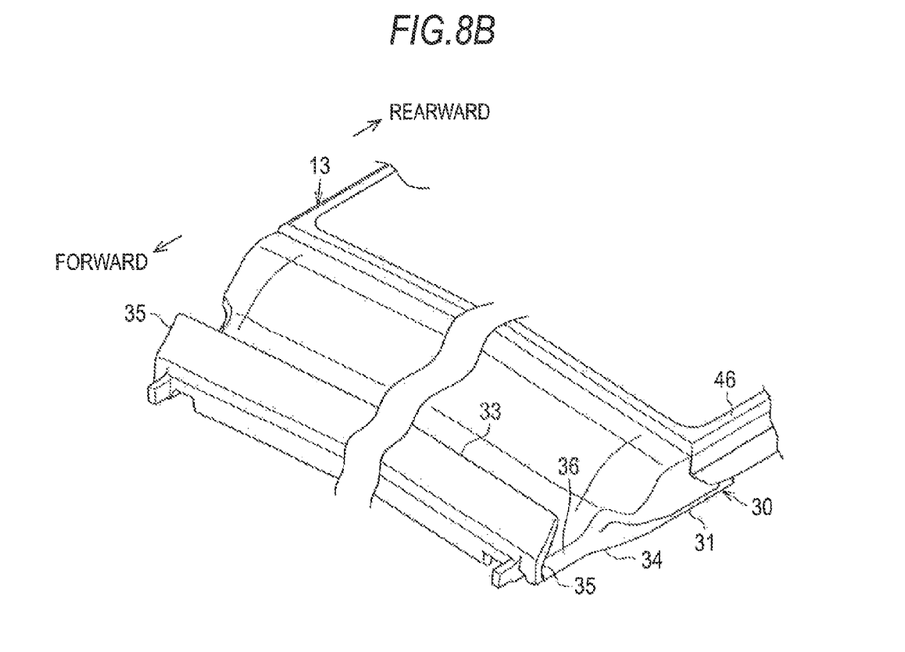
FIG. 8B is a perspective view when a panel weather strip is viewed from above.

Therefore, as illustrated in FIG. 8B, a pair of notches 34 which are recessed in a mode of approaching each other from both sides in the width direction are formed in the front end portion (front tip portion with respect to the vehicle) of the panel weather strip 30. That is, when the movable panel 12 is in the entirely closed state (descended state), the respective notches 34 enables the respective panel side flanges 41a (excluding the rear end portion) to enter further downward from the attachment base 31 (excluding the first and second leg portions 31a and 31b), that is, the sealing surface of the second sealing portion 33. In addition, as collectively illustrated in FIG. 6, a tip surface in the width direction of the attachment base 31 in the respective notches 34 further facilitates downward entry of the respective panel side flanges 41a by forming the tilting surface 36 facing the vehicle interior side as it goes upward.

On the other hand, if the notches 34 to allow the entry of the panel side flange 41a are formed in each side in the width direction of the attachment base 31, a water permeating path W having a substantially V-shaped groove which extends in the longitudinal direction is formed between the notches 34 and the panel side flange 41a.

In the embodiment disclosed here, as illustrated in FIG. 8A, a panel side protruding portion 41c having a substantially triangular shape is disposed to protrude toward the vehicle interior side at the rear and portions of the respective panel side flanges 41a. The panel side protruding portion 41c is sharpened downward and is molded so that the vehicle interior side becomes an oblique side.

Figure 6:
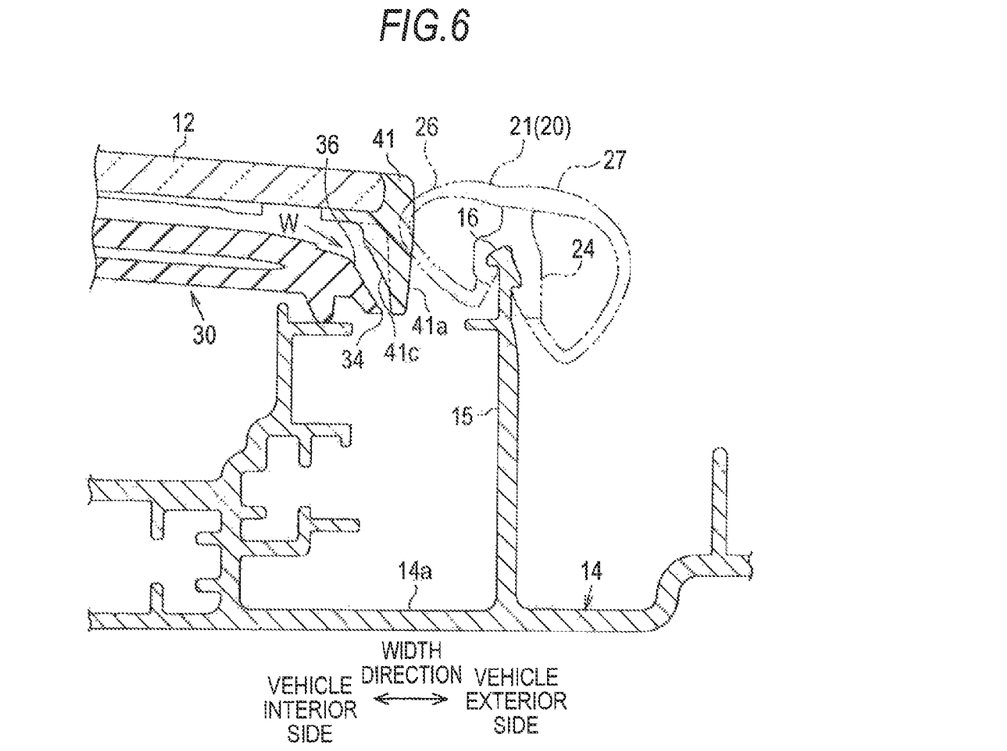
FIG. 6 is a cross-sectional view along line VI-VI in FIG. 3B.

In this manner, as illustrated in FIG. 6, an opening width of the water permeating path W is decreased in the width direction by a protruding amount of the panel side protruding portion 41c, at a position in the longitudinal direction of the panel side protruding portion 41c.

In addition, as illustrated in FIG. 8B, in a connection portion (front end of the attachment base 31) between the attachment base 31 and the second sealing portion 33, a pair of sealing side protruding portions 35 are disposed to protrude toward both sides in the width direction (vehicle exterior side) where the sealing side protruding portions 35 are opposite to each other by following a contour thereof together with the second sealing portion 33. In this manner, the opening width of the water permeating path W is decreased in the width direction by a protruding amount of the sealing side protruding portions 35, at a position in the longitudinal direction of the sealing side protruding portions 35.

Therefore, the panel side protruding portions 41c and the sealing side protruding portions 35 suppress water permeation through the permeating path W.

Next, an operation of the embodiment disclosed here will be described.

Figure 7:
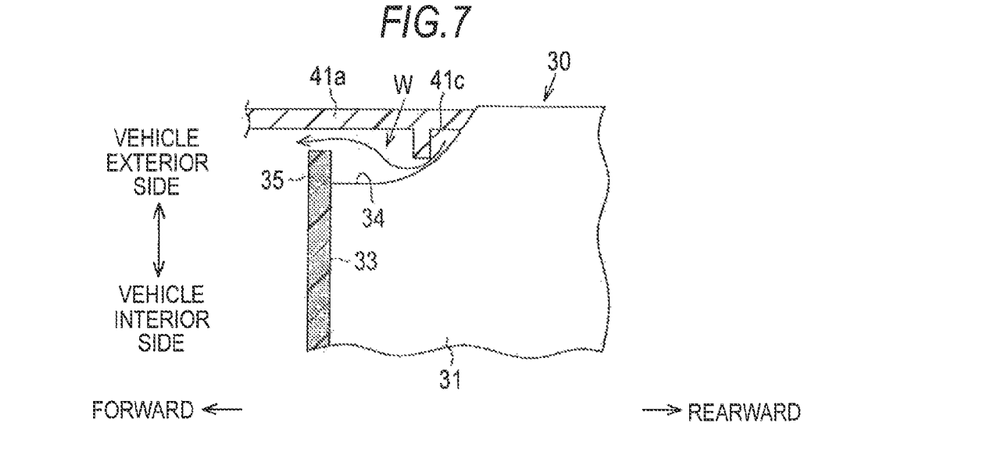
FIG. 7 is a view exaggeratingly illustrating a cross-sectional structure when the embodiment is viewed from above.

As exaggeratingly illustrated in FIG. 7, in the permeating path W formed between the panel weather strip 30 and the panel side flange 41a within a range in the longitudinal direction of the notches 34, the opening width thereof is decreased in the width direction at a position in the longitudinal direction of the panel side protruding portion 41c. Similarly, in the permeating path W, the opening width thereof is decreased in the width direction at a position in the longitudinal direction of the sealing side protruding portion 35. That is, the permeating path W is alternately blocked in the width direction sequentially by the panel side protruding portions 41c and the sealing side protruding portions 35. Accordingly, as illustrated by an arrow in FIG. 7, water attempting to pass through the permeating path W is blocked by the panel side protruding portions 41c and the sealing side protruding portions 35, thereby inevitably meandering. Therefore, for example, when high pressure cleaning solution is injected to clean the vehicle, even if the high pressure cleaning solution permeates the clearance with the first sealing portion 32, a possibility that the high pressure cleaning solution may permeate the permeating path W is reduced. Then, the high pressure cleaning solution whose forward permeation is inhibited is induced to flow downward.

As described in detail above, according to the embodiment disclosed here, the following advantageous effects can be obtained.

(1) In the embodiment disclosed here, for example, when high pressure cleaning solution is injected to clean the vehicle, even if the high pressure cleaning solution permeates the clearance between the first sealing portion 32 and the movable panel 12, it is possible to reduce the possibility that the high pressure cleaning solution may permeate the permeating path W by using the panel side protruding portion 41c. Therefore, it is possible to improve the sealing performance of the tip portion in the width direction in the clearance (boundary portion) between the movable panel 12 and the fixed panel 13. In particular, the panel side protruding portions 41c are disposed to protrude no as to align with the predetermined positions within the range in the longitudinal direction of the notches 34 formed in the panel weather strip 30. In this manner, it is possible to avoid the increase in the arrangement space in the width direction over the entire range in the longitudinal direction of the movable panel 12 and the fixed panel 13 across the clearance (boundary portion) between the movable panel 12 and the fixed panel 13, that is, the arrangement space for the roof apparatus in the width direction within the range.

(2) In the embodiment disclosed here, in the panel weather strip 30, the sealing side protruding portion 35 is disposed to protrude toward the vehicle exterior side in the front end of the attachment base 31 including the second sealing portion 33. In this manner, it is possible to decrease the opening width of the permeating path W in the width direction in the sealing side protruding portion 35.

In particular, the panel side protruding portion 41c and the sealing side protruding portion 35 are configured so that at least portions thereof within the range in the width direction are overlapped with each other, and so as to be separately arranged in the longitudinal direction when the movable panel 12 is in the entirely closed state (descended state). The permeating path W is alternately blocked in the width direction sequentially by the panel side protruding portions 41c and the sealing side protruding portions 35 in the longitudinal direction. In this manner, water attempting to pass through the permeating path W is blocked by the panel side protruding portions 41c and the sealing side protruding portions 35, thereby inevitably meandering.

As described above, for example, when the high pressure cleaning solution is injected to clean the vehicle, it is possible to further reduce the possibility that the high pressure cleaning solution may permeate the permeating path W. Therefore, it is possible to further improve the sealing performance of the tip portion in the width direction in the clearance (boundary portion) between the movable panel 12 and the fixed panel 13.

(3) In the embodiment disclosed here, the edge portion 41 of the movable panel 12 which can come into liquid-tight contact with the side weather strip 21 can bring the side weather strip 21 into contact with the panel side flange 41a so as to be overlapped with each other in the vehicle height direction in the panel side flange 41a. Therefore, it is possible to improve the sealing performance in the clearance in the width direction between the movable panel 12 and the opening 11.

The above-described embodiment may be modified as follows.

Figure 9:
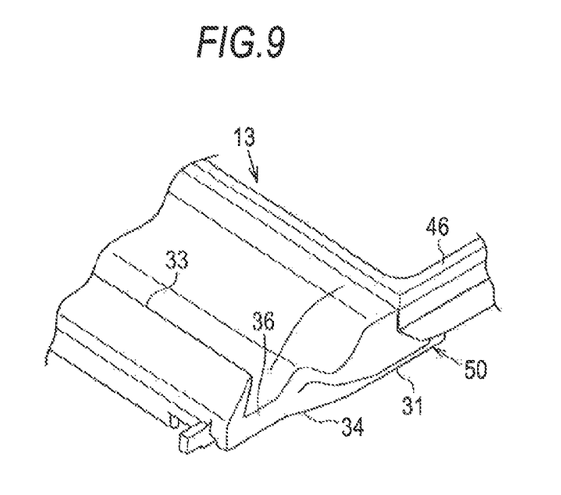
FIG. 9 is a perspective view illustrating a modification example.
Figure 10:
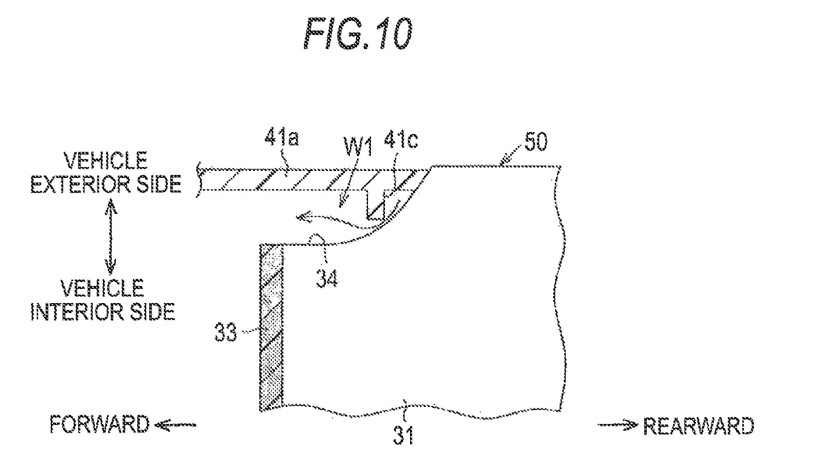
FIG. 10 is a view exaggeratingly illustrating a cross-sectional structure when the modification example is viewed from above.

As illustrated in FIG. 9, the sealing side protruding portion (35) in the front end of the attachment base 31 including the second sealing portion 33 may be omitted to configure the panel weather strip 50. In this case, as exaggeratingly illustrated in FIG. 10, a permeating path W1 formed between the panel weather strip 50 and the panel side flange 41a within the range in the longitudinal direction of the notches 34 is configured so that the opening width thereof is decreased in the width direction at a position in the longitudinal direction of the panel side protruding portion 41c. Accordingly, as illustrated by an arrow in FIG. 10, water attempting to pass through the permeating path W1 is blocked by the panel side protruding portion 41c. Therefore, for example, when high pressure cleaning solution is injected to clean the vehicle, even if the high pressure cleaning solution permeates the clearance with the first sealing portion 32, a possibility that the high pressure cleaning solution may permeate the permeating path W1 is reduced. Then, the high pressure cleaning solution whose forward permeation is inhibited is induced to flow downward.

In the above-described embodiment, the first sealing portion 32 may have a substantially lip shape which can come into liquid-tight contact with the tilting surface 41b of the movable panel 12. On the other hand, the second sealing portion 33 may have a substantially arc shape in a cross-sectional view, which can come into liquid-tight contact with the movable panel 12 or the lower surface of the base panel 42 and which forms a hollow portion in cooperation with the attachment base 31.

In the above-described embodiment, the edge portions 41 and 46 may be molded using hard rubber or the like.

In the above-described embodiment, instead of the fixed panel 13, a movable panel may be employed which can open and close the rear portion of the opening 11 in response to the ascending and descending operation. In this case, the panel side protruding portion may be disposed in the panel side flange of the panel, and the panel weather strip (30) may be disposed in the rear edge end of the movable panel 12 (base panel 42).

In the above-described embodiment, the number of panels for closing the opening 11 may be three or more. In this case, one of two arbitrary panels adjacent to each other in the longitudinal direction may be the movable panel serving as the first panel having the panel side protruding portion (41c), and the other may be the fixed panel or the movable panel serving as the second panel in which the panel weather strip (30) is disposed.

In the above-described embodiment, the opening and closing operation of the panel (first panel) in response to the ascending and descending operation includes the pop-up operation or the tilt-up operation. In addition, as long as the pop-up operation or the tilt-up operation is possible, the sliding operation in the longitudinal direction may not be possible.

Next, a technical idea which can be understood through the above-described embodiment and another example will be additionally described as follows.

In the roof apparatus, the second panel is the fixed panel arranged in the vehicle rear part of the first panel.

An aspect of this disclosure is directed to a roof apparatus including: a plurality of panels that are juxtaposed in a vehicle longitudinal direction and configured to cover an opening formed in a roof of a vehicle and to adapt to the roof, a first panel serving as one of the plurality of panels being configured to be capable of opening and closing the opening in response to an ascending and descending operation; a pair of downward-erected walls that extend to both edge portions in a vehicle width direction of the first panel along the vehicle longitudinal direction, and that extend downward in a vehicle height direction; a sealing member that extends along the vehicle width direction on an edge portion of a second panel facing the first panel in the vehicle longitudinal direction, the second panel serving as one of the plurality of panels, and being adjacent to the first panel and arranged in front of or behind the first panel in the vehicle longitudinal direction, the sealing member having a sealing portion which can be in liquid-tight contact with an edge end in the vehicle longitudinal direction of the first panel and a lower surface of the edge portion in the vehicle longitudinal direction of the first panel, and a tip portion in the vehicle longitudinal direction of the sealing member having a pair of notches which are recessed in a mode of approaching each other from both sides facing each other in the vehicle width direction so that both of the downward-erected walls can enter further downward in the vehicle height direction than a sealing surface of the sealing portion when the first panel is in a descended state; and a pair of panel side protruding portions that are respectively disposed to protrude in the vehicle width direction where the pair of panel side protruding portions respectively face both of the downward-erected walls, and that are arranged at predetermined positions within a range in the vehicle longitudinal direction of both of the notches, when the first panel is in the descended state.

According to this configuration, the tip portion in the vehicle longitudinal direction of the sealing member has the pair of notches so that both of the downward-erected walls can enter further downward in the vehicle height direction than the sealing portion when the first panel is in the descended state, that is, in an entirely closed state. For this reason, for example, a clearance is formed in the vehicle width direction between the respective downward-erected walls and the respective notches, thereby forming a permeating path for water in the vehicle longitudinal direction. However, the panel side protruding portions disposed to protrude to the respective downward-erected walls are arranged at the predetermined positions within the range in the vehicle longitudinal direction of the respective notches, when the first panel is in the descended state. In this manner, in the panel side protruding portions, it is possible to decrease an opening width of the permeating path in the vehicle width direction. Accordingly, for example, when a high pressure cleaning solution is injected to clean a vehicle, even if the high pressure cleaning solution permeates the clearance with the sealing portion, it is possible to reduce a possibility that the high pressure cleaning solution may permeate the permeating path. Therefore, it is possible to improve a sealing performance of the tip portion in the vehicle width direction in the clearance (boundary portion) between the first panel and the second panel. In particular, the panel side protruding portions are disposed to protrude so as to align with the predetermined positions within the range in the vehicle longitudinal direction of the notches formed in the sealing member. In this manner, it is possible to avoid an increase in an arrangement space in the vehicle width direction, over the entire range in the vehicle longitudinal direction across the clearance between the first panel and the second panel.

In the roof apparatus according to the aspect of this disclosure, it is preferable that the sealing portion include a first sealing portion which is arranged in a base end portion in the vehicle longitudinal direction of the sealing member, and which can be in liquid-tight contact with the edge portion in the vehicle longitudinal direction of the first panel; and a second sealing portion which is arranged in the tip in the vehicle longitudinal direction of the sealing member, and which can be in liquid-tight contact with the lower surface of the edge portion in the vehicle longitudinal direction of the first panel.

In the roof apparatus according to the aspect of this disclosure, it is preferable that the sealing member has a pair of sealing side protruding portions which are disposed to protrude to both sides in the vehicle width direction where both sides opposite to each other, from the tip in the vehicle longitudinal direction including the second sealing portion.

According to this configuration, the sealing member has the sealing side protruding portions which are disposed to protrude to each side in the vehicle width direction from the tip in the vehicle longitudinal direction which includes the second sealing portion. In this manner, it is possible to decrease the opening width of the permeating path in the sealing side protruding portions in the vehicle width direction. Accordingly, for example, when high pressure cleaning solution is injected to clean the vehicle, it is possible to further reduce the possibility that the high pressure cleaning solution may permeate the permeating path. Therefore, it is possible to further improve the sealing performance of the tip portion in the vehicle width direction in the clearance (boundary portion) between the first panel and the second panel.

In the roof apparatus according to the aspect of this disclosure, it is preferable that the panel side protruding portions and the sealing side protruding portions be configured so that at least portions in a range in the vehicle width direction are overlapped with each other, and are separately arranged in the vehicle longitudinal direction when the first panel is in the descended state.

According to this configuration, the permeating path is alternately blocked in the vehicle width direction sequentially by the panel side protruding portions and the sealing side protruding portions toward the vehicle longitudinal direction. Accordingly, water attempting to pass through the permeating path is blocked by the panel side protruding portions and the sealing side protruding portions, thereby inevitably meandering. Therefore, for example, when high pressure cleaning solution is injected to clean the vehicle, it is possible to further reduce the possibility that the high pressure cleaning solution may permeate the permeating path.

In the roof apparatus according to the aspect of this disclosure, it is preferable that both of the edge portions in the vehicle width direction of the first panel be in liquid-tight contact with a pair of body weather strips which extend in the vehicle longitudinal direction along both edge portions in the vehicle width direction of the opening.

According to this configuration, the respective edge portions in the vehicle width direction of the first panel which can be in liquid-tight contact with the respective body weather strips can bring the respective body weather strips into contact with the downward-erected walls so as to be overlapped in the vehicle height direction. Therefore, it is possible to improve the sealing performance in the clearance in the vehicle width direction between the first panel and the opening.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roof apparatus comprising:
a plurality of panels that are juxtaposed in a vehicle longitudinal direction and configured to cover an opening formed in a roof of a vehicle and to adapt to the roof, a first panel serving as one of the plurality of panels being configured to be capable of opening and closing the opening in response to an ascending and descending operation;
a pair of downward-erected walls that extend to both edge portions in a vehicle width direction of the first panel along the vehicle longitudinal direction, and that extend downward in a vehicle height direction;
a sealing member that extends along the vehicle width direction on an edge portion of a second panel facing the first panel in the vehicle longitudinal direction, the second panel serving as one of the plurality of panels and being adjacent to the first panel and arranged in front of or behind the first panel in the vehicle longitudinal direction, the sealing member having a sealing portion which can be in liquid-tight contact with an edge end in the vehicle longitudinal direction of the first panel and a lower surface of the edge portion in the vehicle longitudinal direction of the first panel, and a tip portion in the vehicle longitudinal direction of the sealing member having a pair of notches which are recessed in a mode of approaching each other from both sides facing each other in the vehicle width direction so that both of the downward-erected walls can enter further downward in the vehicle height direction than a sealing surface of the sealing portion when the first panel is in a descended state; and
a pair of panel side protruding portions that are respectively disposed to protrude in the vehicle width direction where the pair of panel side protruding portions respectively face both of the downward-erected walls, and that are arranged at predetermined positions within a range in the vehicle longitudinal direction of both of the notches, when the first panel is in the descended state.

2. The roof apparatus according to claim 1,
wherein the sealing portion includes a first sealing portion which is arranged in a base end portion in the vehicle longitudinal direction of the sealing member, and which can be in liquid-tight contact with the edge portion in the vehicle longitudinal direction of the first panel; and a second sealing portion which is arranged in the tip in the vehicle longitudinal direction of the sealing member, and which can be in liquid-tight contact with the lower surface of the edge portion in the vehicle longitudinal direction of the first panel.

3. The roof apparatus according to claim 2,
wherein the sealing member has a pair of sealing side protruding portions which are disposed to protrude to both sides in the vehicle width direction where the both sides opposite to each other, from the tip in the vehicle longitudinal direction including the second sealing portion.

4. The roof apparatus according to claim 3,
wherein the panel side protruding portions and the sealing side protruding portions are configured so that at least portions in a range in the vehicle width direction are overlapped with each other, and are separately arranged in the vehicle longitudinal direction when the first panel is in the descended state.

5. The roof apparatus according to claim 1,
wherein both of the edge portions in the vehicle width direction of the first panel can be in liquid-tight contact with a pair of body weather strips which extend in the vehicle longitudinal direction along both edge portions in the vehicle width direction of the opening.

6. The roof apparatus according to claim 2,
wherein both of the edge portions in the vehicle width direction of the first panel can be in liquid-tight contact with a pair of body weather strips which extend in the vehicle longitudinal direction along both edge portions in the vehicle width direction of the opening.

7. The roof apparatus according to claim 3,
wherein both of the edge portions in the vehicle width direction of the first panel can be in liquid-tight contact with a pair of body weather strips which extend in the vehicle longitudinal direction along both edge portions in the vehicle width direction of the opening.

8. The roof apparatus according to claim 4,
wherein both of the edge portions in the vehicle width direction of the first panel can be in liquid-tight contact with a pair of body weather strips which extend in the vehicle longitudinal direction along both edge portions in the vehicle width direction of the opening.

* * * * *